United States Patent
Tu et al.

(10) Patent No.: US 12,528,068 B2
(45) Date of Patent: Jan. 20, 2026

(54) $CO_2$ HYDROGENATION TO OXYGENATES USING PLASMA CATALYSIS

(71) Applicant: THE UNIVERSITY OF LIVERPOOL, Liverpool (GB)

(72) Inventors: Xin Tu, Liverpool (GB); Yaolin Wang, Liverpool (GB)

(73) Assignee: THE UNIVERSITY OF LIVERPOOL, Liverpool (GB)

( * ) Notice: Subject to any disclaimer, the term of this patent is extended or adjusted under 35 U.S.C. 154(b) by 525 days.

(21) Appl. No.: 18/001,789

(22) PCT Filed: Jun. 15, 2021

(86) PCT No.: PCT/GB2021/051480
§ 371 (c)(1),
(2) Date: Dec. 14, 2022

(87) PCT Pub. No.: WO2021/255422
PCT Pub. Date: Dec. 23, 2021

(65) Prior Publication Data
US 2023/0234019 A1    Jul. 27, 2023

(30) Foreign Application Priority Data

Jun. 15, 2020  (GB) ........................................ 2009094
Dec. 1, 2020   (GB) ...................................... 2018940

(51) Int. Cl.
*B01J 19/08*    (2006.01)
*B01J 23/72*    (2006.01)
(Continued)

(52) U.S. Cl.
CPC ............. *B01J 19/088* (2013.01); *B01J 23/72* (2013.01); *B01J 23/75* (2013.01); *B01J 23/755* (2013.01);
(Continued)

(58) Field of Classification Search
CPC . B01J 19/088; B01J 23/72; B01J 23/75; B01J 35/33; B01J 37/347;
(Continued)

(56) References Cited

FOREIGN PATENT DOCUMENTS

| CN | 109529851 A | 3/2019 |
|---|---|---|
| CN | 110560032 A | 12/2019 |

OTHER PUBLICATIONS

PCT International Search Report and Written Opinion for International Application No. PCT/GB2021/051480, dated Sep. 14, 2021, 10 pages.

(Continued)

*Primary Examiner* — Jafar F Parsa
(74) *Attorney, Agent, or Firm* — Hoffman Warnick LLC

(57) ABSTRACT

An apparatus for forming C1 to C5 alcohol, carboxylic acid, or mixture thereof from carbon dioxide and hydrogen is described. The apparatus comprises: a dielectric barrier discharge, DBD, device arranged to generate a plasma; and a passageway having an inlet for the carbon dioxide and the hydrogen and an outlet for the C1 to C5 alcohol, carboxylic acid, or mixture thereof and including therein a catalyst comprising nickel and/or cobalt and/or copper on a support. The passageway extends, at least in part, through the DBD device wherein, in use, the carbon dioxide is exposed to the catalyst in the presence of the hydrogen in the generated plasma, thereby forming the C1 to C5 alcohol, carboxylic acid, or mixture thereof from at least some of the carbon dioxide and the hydrogen. The DBD devices comprises a water electrode. A method and a catalyst are also described.

14 Claims, 12 Drawing Sheets

(51) Int. Cl.
    *B01J 23/75*     (2006.01)
    *B01J 23/755*    (2006.01)
    *B01J 35/33*     (2024.01)
    *B01J 37/34*     (2006.01)
    *C07C 27/06*     (2006.01)
    *C07C 29/154*    (2006.01)

(52) U.S. Cl.
    CPC ............ *B01J 35/33* (2024.01); *B01J 37/347* (2013.01); *C07C 27/06* (2013.01); *C07C 29/154* (2013.01); *B01J 2219/0837* (2013.01); *B01J 2219/0871* (2013.01); *C07C 2523/72* (2013.01); *C07C 2523/75* (2013.01); *C07C 2523/755* (2013.01)

(58) Field of Classification Search
    CPC ........ B01J 2219/0837; B01J 2219/0871; B01J 2219/0809; B01J 2219/083; C07C 29/156; C07C 31/04; C07C 51/12; C07C 53/08; C07C 2523/72
    See application file for complete search history.

(56) References Cited

OTHER PUBLICATIONS

Great Britain Search Report for Application No. GB2009094.0, dated Dec. 1, 2020, 5 pages.
Wang et al., "Atmospheric Pressure and Room Temperature Synthesis of Methanol through Plasma-Catalytic Hydrogenation of CO2," ACS Catalysis, vol. 8, 2018, pp. 90-100.

CO₂ HYDROGENATION TO OXYGENATES USING PLASMA CATALYSIS

FIELD

The present invention relates to catalysts and methods, for example catalysts and methods for use in carbon dioxide hydrogenation processes. Particularly, the present invention relates to methods and catalysts comprising nickel and/or cobalt for use in carbon dioxide hydrogenation using a non-thermal plasma generated by dielectric barrier discharge (DBD).

BACKGROUND TO THE INVENTION

The conversion and utilization of $CO_2$, an increasingly attractive C1 building block, not only contributes to alleviating global climate changes induced by the increasing $CO_2$ emissions but also opens up new sustainable routes for synthesizing useful feedstock chemicals and fuels.

As $CO_2$ is a thermodynamically stable molecule, considerable efforts have been devoted to activating the C=O bond and converting to more valuable products efficiently over the past decades. Catalytic hydrogenation is among the most important conversion pathways for $CO_2$, leading to a variety of products (CO, $CH_4$, $CH_3OH$, and other oxygenates), depending on the reaction conditions and catalysts used. So far, $CO_2$ hydrogenation could directly lead to three C-containing chemicals: $CH_4$, CO (via RWGS) and $CH_3OH$. Generally, natural gas ($CH_4$) looks as a major energy source, and CO is also an essential chemical feedstock for the synthesis of a range of fuels and platform chemicals, especially for methanol synthesis via Fischer-Tropsch process.

The catalytic activation of $CO_2$, however, remains challenging, primarily because of the chemical inertness of $CO_2$ molecules. Therefore, high temperature and/or high pressure is usually required to overcome the activation barrier during conventional catalytic conversions. Non-thermal plasmas have been employed as a highly promising approach for converting a wide range of stable C-containing molecules to syngas, alcohols and oxygenates under low temperature and ambient pressure. The energetic electrons can activate molecules via excitation, dissociation and ionization. The reactive species (i.e. radicals, ions, excited species) generated in the plasma contribute to both the gas phase reactions and surface reactions, initiating new reaction pathways at low temperatures and ambient pressure.

For example, $CO_2$ hydrogenation to methanol is favoured to occur at low temperatures and high pressures due to the reaction thermodynamics, as it is an exothermic and molecule-reducing reaction. However, low-temperature operation suffers from a dynamic limitation in $CO_2$ activation, in contrast to the thermodynamic limitation of the reaction at high temperatures.

In addition, although high temperature facilitates $CO_2$ activation, the simultaneous formation of CO through the reverse water gas shift is the primary competitive reaction for methanol synthesis in $CO_2$ hydrogenation. Plasma catalysis provides a promising and alternative to overcome these barriers in thermal catalytic $CO_2$ hydrogenation and to enable $CO_2$ hydrogenation for the selective production of C1 to C5 alcohol, carboxylic acid, or mixture thereof at near room temperature and ambient pressure.

Thus, there is a need to improve plasma-catalytic carbon dioxide hydrogenation.

SUMMARY OF THE INVENTION

It is one aim of the present invention, amongst others, to provide an apparatus and method for converting carbon dioxide and hydrogen into C1 to C5 alcohol, carboxylic acid, or mixture thereof, which at least partially obviates or mitigates at least some of the disadvantages of the prior art, whether identified herein or elsewhere. For instance, it is an aim of embodiments of the invention to provide an apparatus to provide plasma-catalytic synthesis of C1 to C5 alcohol, carboxylic acid, or mixture thereof from carbon dioxide and hydrogen, with a high carbon dioxide conversion, high selectivity of C1 to C5 alcohol, carboxylic acid, or mixture thereof, high C1 to C5 alcohol, carboxylic acid, or mixture thereof yield and/or energy efficiency.

For instance, it is an aim of embodiments of the invention to provide a method of synthesising C1 to C5 alcohol, carboxylic acid, or mixture thereof from carbon dioxide and hydrogen at low temperature or near room temperature using plasma. For instance, it is an aim of embodiments of the invention to provide an apparatus for and/or a method of carbon dioxide hydrogenation that does not require additional heating and can be conducted at ambient pressure. For instance, it is an aim of embodiments of the invention to provide an apparatus for and/or a method of carbon dioxide hydrogenation that may be integrated with renewable energy sources (e.g. wind and solar power), especially the use of intermittent renewable energy during peak load for localised or distributed energy storage.

DETAILED DESCRIPTION OF THE INVENTION

According to the present invention there is provided an apparatus, as set forth in the appended claims. Also provided is a method. Other features of the invention will be apparent from the dependent claims, and the description that follows.

Apparatus

A first aspect provides an apparatus for forming C1 to C5 alcohol, carboxylic acid, or mixture thereof from carbon dioxide and hydrogen, the apparatus comprising:
- a dielectric barrier discharge, DBD, device arranged to generate a plasma; and
- a passageway including an inlet for the carbon dioxide and the hydrogen and an outlet for the C1 to C5 alcohol, carboxylic acid, or mixture thereof and having a catalyst comprising nickel and/or cobalt on a support therein, wherein the passageway extends, at least in part, through the DBD device wherein, in use, the carbon dioxide is exposed to the catalyst in the presence of the hydrogen in the generated plasma, thereby forming the C1 to C5 alcohol, carboxylic acid, or mixture thereof from at least some of the carbon dioxide and the hydrogen and wherein the DBD device comprises a water electrode.

The apparatus is suitable for forming C1 to C5 alcohol, carboxylic acid, or mixture thereof from carbon dioxide and hydrogen. The apparatus is suitably for forming liquid C1 to C5 alcohol, carboxylic acid, or mixture thereof from carbon dioxide and hydrogen. For the avoidance of doubt, the carbon dioxide and hydrogen are provided in gaseous form. Other products may be formed, for example water, carbon monoxide and/or other short chain gaseous hydrocarbons such as methane. However, these gaseous products can be separated and/or removed. In one example, the apparatus comprises a separation unit for separating the C1 to C5 alcohol, carboxylic acid, or mixture thereof.

In one example, the C1 to C5 alcohols include methanol, ethanol and propanol. In one example, the C1 to C5 carboxylic acids include methanoic acid (otherwise referred to as formic acid), ethanoic acid (otherwise referred to as acetic acid) and propanoic acid. The C1 to C5 alcohol, carboxylic acid, or mixture thereof may additionally or alternatively be described as liquid hydrocarbon fuels.

A mixture of products may be formed. In one example, the product may be a mixture of methanol and ethanoic acid.

The apparatus comprises the DBD device comprising water as an electrode. In one example, the DBD device comprises water as a ground electrode.

Generally, DBDs are self-sustaining electrical discharges between electrodes having an insulating material (i.e. the dielectric barrier) in the discharge path (also known as a discharge zone). The dielectric is responsible for self-pulsing of the plasma, resulting in a nonthermal plasma at ambient pressures. Typically, dielectrics include glass, quartz, ceramics, enamel, mica, polymeric compositions and silicon rubber. Other dielectrics are known. The discharge gap is typically 1 to 10 mm, so as to allow operation at ambient pressures and moderate voltage amplitudes. Alternating current or pulsed high-voltage, typically in a range from about 1 kV to 100 kV at frequencies in a range from about 50 Hz to 1 MHz, are required due to the capacitive properties of the electrode and dielectric assembly. DBD reactors with planar configurations and axial electrode arrangements are often used for chemical reactions.

In one example, the DBD device comprises a set of electrodes, including a first electrode and a second electrode, having a dielectric barrier there between. The DBD device comprises a water electrode as a ground electrode. This may be referred to herein as the first electrode. The DBD device thus comprises a second, non-liquid electrode. This may be referred to herein as the second electrode.

In one example, the set of electrodes is arranged in a coaxial configuration. In one example, the DBD device comprises a coaxial DBD. In this way, an annular discharge zone may be formed. In one example, the first electrode comprises and/or is a first tube, for example a cylindrical tube, and the second electrode comprises and/or is a wire, a rod or a second tube, for example a cylindrical tube, coaxial there within, wherein the dielectric barrier is in contact with the first electrode or the second electrode. In other words, the first electrode may be an outer tube and the second electrode may be an inner wire. For example, the dielectric barrier may be provided on internal surfaces of the first electrode, in which the plasma is formed in the gas at the surface of the dielectric barrier and propagates radially across a volume to the second electrode. Additionally and/or alternatively, the dielectric barrier may be provided on outer surfaces of the second electrode, in which the plasma is formed in the gas at the surface of the dielectric barrier and propagates readily across a volume to the first electrode.

It should be understood that the electrodes are thus electrical conductors. In one example, the second, non-water electrode comprises and/or is a metallic electrode, for example a metal or alloy. In one example, the first electrode comprises and/or is a metallic plate, sheet, film or wire electrode. For example, the second electrode may be provided by solid metal plate or sheet, by printing metal films on the dielectric, by etching of circuit boards, by depositing metallic film or paste on the dielectric or by using wire mesh, for example. Other electrodes are known.

In one example, the first electrode comprises and/or is a non-metal cylinder filled with circulating cooling water. The inner surface of this cylinder can be used as dielectric barrier.

In one example, the dielectric barrier comprises and/or is glass, quartz, ceramic, enamel, mica, a polymeric composition and/or silicon rubber. Suitable glasses include silicate glass, such as soda lime glass, borosilicate glass, lead glass, aluminosilicate glass, and silica-free glass.

In one example, the DBD device comprises: a quartz tube (i.e. providing the passageway) having a gas inlet (i.e. the inlet) in an upper portion thereof and the outlet in a lower portion thereof; an inner electrode having, for example, a cylindrical rod shape and provided in the quartz glass tube; an outer electrode, for example water, around at least in part the outer surface of the quartz glass tube; and the catalyst contained in the quartz glass tube between the inner electrode and the outer electrode (i.e. a coaxial configuration).

In one example, the inner electrode comprises and/or is a stainless steel rod or wire and the outer electrode comprises and/or is a cylindrical tubular stainless-steel mesh coaxial therewith.

In one example, the apparatus comprises a gas supply unit for supplying the carbon dioxide ($CO_2$) gas and the hydrogen ($H_2$) gas.

In one example, the gas supply unit further supplies nitrogen ($N_2$) or argon (Ar) gas to generate, at least in part, the DBD plasma. However, this may not be preferred. In one preferred example, no further gas is supplied to generate the DBD plasma.

The passageway includes therein the catalyst comprising nickel and optionally cobalt therein In one example, the catalyst is provided in the form of particles, granules, pellets, tablets plates and/or conglomerates thereof. In one example, the catalyst is provided in the form of particles, for example, granules, having an average particle diameter in a range from 0.05 mm to 1.0 mm, preferably in a range from 0.1 mm to 0.75 mm, more preferably in a range from 0.25 mm to 0.50 mm or 0.45 mm. These could be controlled by sieves. Other methods of measuring the average particle diameter will be known by the skilled person.

In one example, the catalyst is held on a support. It should be understood that the catalyst is affixed to the support. For example, the catalyst may be impregnated in the support (i.e. prepared by impregnation). Additionally and/or alternatively, the supporter catalyst may be prepared by co-precipitation.

In one example, the support comprises and/or is selected from the group consisting of $SiO_2$ (fumed and mesoporous), $TiO_2$, $Al_2O_3$, $CeO_2$, $ZrO_2$, ZnO, $Cr_2O_3$, carbon nanotubes, $Ga_2O_3$, $In_2O_3$ and zeolite. In one example, the support comprises particles having a morphology selected from nanocube, nanorod and/or nanoparticle, and/or a porous structure, for example a microporous structure, a mesoporous structure and/or a hierarchical porous network. In one example, the support comprises and/or is alumina ($Al_2O_3$). In one example, the alumina comprises and/or is $\gamma$-$Al_2O_3$. $\gamma$-$Al_2O_3$ is preferred to $\alpha$-$Al_2O_3$, for example, having a higher BET surface area. Activated $Al_2O_3$ may also be used. In one example, the support comprises and/or is mesoporous silica ($SiO_2$), preferably aerosol $SiO_2$ and/or having a relatively higher Brunauer-Emmett-Teller (BET) specific surface area.

In one example, the support has a BET specific surface area in a range from 200 to 300 $m^2/g$, and has a pore volume in a range from 0.4 to 0.8 $cm^3/g$ with a pore size in a range from 3.5 nm to 4.0 nm. In one example, these physical properties could be measured using a standard $N_2$-physisorption measurements, for example as known by the skilled person. For example, $N_2$ adsorption-desorption may be conducted using a Micromeritics ASAP 2020 Sorptometer at $-196°$ C. Prior to measurement, the samples are degassed at 300° C. for 6 h. The specific surface areas may be estimated via the BET method in the $P/P_0$ values ranging from 0.05 to 0.3 of the fresh catalysts.

In one example, the support comprises and/or is a zeolite structure. In one example, the zeolite structure comprises and/or is ZSM-5.

In one example, hierarchical ZSM-5 nanocrystals may be used. Suitably the ZSM-5 may comprise different Si/Al ratios. Such ratios are known to the skilled person and are commonly referred to in brackets, for example ZSM-5 (Si/Al ratio 28).

In one example, the ZSM-5 has a BET specific surface area in a range from 200 to 300 $m^2/g$, and comprises a mesoporous volume in a range from 0.05 to 0.2 $cm^3/g$. In one example, these physical properties could be measured using a standard $N_2$-physisorption measurements, for example as known by the skilled person. For example, $N_2$ adsorption-desorption may be conducted using a Micromeritics ASAP 2020 Sorptometer at $-196°$ C. Prior to measurement, the samples are degassed at 300° C. for 6 h. The specific surface areas may be estimated via the BET method in the $P/P_0$ values ranging from 0.05 to 0.3 of the fresh catalysts.

Thus, in one example, the support comprises and/or is selected from the group consisting of $SiO_2$ (fumed and mesoporous), $TiO_2$, $Al_2O_3$, $CeO_2$, $ZrO_2$, $ZnO$, $Cr_2O_3$, carbon nanotubes, $Ga_2O_3$, $In_2O_3$ and ZSM-5.

In one preferred example, the support comprises and/or is selected from $Al_2O_3$, ZSM-5 and/or mesoporous $SiO_2$. In one example, the support is selected from $Al_2O_3$, ZSM-5 and/or mesoporous $SiO_2$.

In one example, the catalyst comprises nickel in a range from 1 to 20 wt. %, preferably in a range from 1 to 15 wt. %, more preferably in a range from 2 to 12 wt. %, even more preferably in a range from 5 to 10 wt. % nickel by weight of the support.

In one example, the catalyst comprises cobalt in a range from 1 to 20 wt. %, preferably in a range from 1 to 15 wt. %, more preferably in a range from 2 to 12 wt. %, even more preferably in a range from 3 to 10 wt. % cobalt by weight of the support.

In one example, the catalyst comprises copper in a range from 1 to 20 wt. %, preferably in a range from 1 to 15 wt. %, more preferably in a range from 2 to 12 wt. %, even more preferably in a range from 3 to 10 wt. % copper by weight of the support.

It has surprisingly been found by the inventors that a catalyst comprising nickel and/or cobalt and/or copper is particularly suitable for plasma-catalytic C02 hydrogenation reactions. In one example, the apparatus of the first aspect, when in use, obtains a high $CO_2$ conversion, C1 to C5 alcohol, carboxylic acid, or mixture thereof selectivity, yield and/or energy efficiency without using any heating equipment.

In one example, the catalyst consists essentially (at least 99 wt. % by weight of the catalyst) or consists (at least 99.9 wt. % by weight of the catalyst) of nickel and/or cobalt and/or copper and optionally species thereof and unavoidable impurities. Unavoidable impurities include, for example, other metals.

In one example, the catalyst comprises and/or is support impregnated with metallic nickel and/or metallic cobalt and/or metallic copper.

In one preferred example, the catalyst comprises and/or is an alumina support impregnated with metallic nickel and/or metallic cobalt and/or metallic copper.

In one example, the catalyst is prepared using incipient wetness impregnation (IW or IWI), which is also known in the art as capillary impregnation or dry impregnation. In one example, a nickel and/or cobalt precursor is dissolved in an aqueous solution and the nickel-containing and/or cobalt-containing and/or copper-containing solution is added to a support. Capillary action draws the solution into the pores. The catalyst may then be dried and optionally calcined to drive off the volatile components within the solution, thereby depositing nickel and/or cobalt and/or copper on the support surface. Methods of preparing such catalysts are well known. In one example, calcining is performed at a temperature in a range from 400 to 600° C., for a time in a range from 4 hours to 6 hours and/or at a heating rate in a range from 5° C. per minute to 10° C. per minute.

In one example, the catalyst comprises an alumina support impregnated with nickel. In one example, the alumina support is impregnated with metal precursors of nitrate hydrate for nickel (II) before the calcination.

In one example, the nickel precursor is nickel nitrate.

In one example, the catalyst comprises metallic nickel. In one example, the catalyst comprises a metallic nickel species after thermal reduction of NiO/alumina in $H_2$, $H_2/Ar$ and/or $N_2/H_2$. In one example, the nickel may be anchored to the support.

In one example, the catalyst comprises an alumina support impregnated with cobalt. In one example, the alumina support is impregnated with metal precursors of cobalt nitrate for cobalt oxides before the calcination. These oxides may be present as Co (II) and/or Co (III).

In one example, the cobalt precursor is cobalt nitrate.

In one example, the catalyst comprises metallic cobalt.

In one example, the catalyst comprises or is a nickel/ZSM-5 zeolite.

In one example, the catalyst comprises nickel and/or cobalt particles. In one example, the nickel and/or cobalt particles have a mean particle diameter in a range from 1 nm to 15 nm, preferably in a range from 2 nm to 12 nm, more preferably in a range from 3 nm to 10 nm. Generally, smaller particles are preferred. Methods of measuring the mean particle diameter are known, for example, using transmission electron microscopy (TEM) or high resolution transmission electron microscopy (HRTEM).

In one example, the nickel and/or cobalt particles are evenly distributed, for example dispersed, on the support. In one example, the nickel and/or cobalt particles are uniformly distributed on the support. In one example, the nickel and/or cobalt particles are regularly distributed on the support. In one example, the nickel and/or cobalt particles are homogenously distributed on the support. The distribution of the nickel and/or cobalt particles may be determined, for example qualitatively and/or quantitatively, using TEM, HRTEM and/or CO adsorption, for example.

In one example, the catalyst comprises other nickel species, for example Ni, NiO, and/or $NiAl_2O_4$. These species may form in use (i.e. during the reaction).

In one example, the catalyst comprises other cobalt species, for example Co, $CoO_x$ and $CoAl_2O_4$. These species may form in use (i.e. during the reaction).

In one example, the catalyst comprises other non-nickel and/or non-cobalt species, such as hydroxyl groups. These species may form in use (i.e. during the reaction).

In one example, the catalyst comprises nickel and cobalt. The catalyst may therefore comprise bimetallic nickel-cobalt alloy nanoparticles.

In one example, the copper precursor comprises and/or is copper nitrate.

In one example, a series of supports, including $Al_2O_3$, $TiO_2$, $CeO_2$, $SiO_2$ (mesoporous), are impregnated with metal precursors of copper hydrate for copper (II) before the calcination.

In one example, the catalyst comprises metallic copper species.

In one example, the catalyst comprises other copper species, such as Cu and $CuO_x$.

In one example, the total amount of metallic species is from 1 to 10 wt. % by weight of the support.

In one example, the catalyst comprises nickel in a range from 9 to 1 wt. % by weight of the support and cobalt in a range from 1 to 9 wt. % by weight of the support. In one example, the catalyst comprises 7 wt. % nickel and 3 wt. % cobalt, by weight of the support. In one example, the catalyst comprises 5 wt. % nickel and 5 wt. % cobalt, by weight of the support. In one example, the catalyst comprises 3 wt. % nickel and 7 wt. % cobalt, by weight of the support.

In one especially preferred example, the catalyst consists essentially (at least 99 wt. % by weight of the catalyst) or consists (at least 99.9 wt. % by weight of the catalyst) of alumina, nickel and cobalt and unavoidable impurities.

In one especially preferred example, the catalyst consists essentially (at least 99 wt. % by weight of the catalyst) or consists (at least 99.9 wt. % by weight of the catalyst) of mesoporous $SiO_2$, copper and unavoidable impurities.

In one example, the apparatus comprises a source of external heat to provide additional heat to the reaction when in use. However, this is not preferred. In one preferred example, the apparatus does not comprise an or any external heating source(s).

The apparatus may comprise additional safety features. For example, the apparatus may comprise an additional cooling source to reduce temperature when the apparatus is in use. However, this is not preferred. In one example, the apparatus is used at low temperature and thus no additional cooling sources are needed. In one particularly preferred example, the water from the water electrode may be used to cool the reaction. This provides significant advantages in use.

For example, conventional apparatuses often operate at high temperatures and are therefore energy-intensive. Additionally and/or alternatively, conventional apparatuses typically require cooling, since direction is exothermic, to attenuate heating. In contrast, the apparatus according to the first aspect may not require additional cooling since the reaction temperature is relatively low and/or the use of a water electrode means that water can be used to cool the reaction.

Method

A second aspect provides a method of forming C1 to C5 alcohol, carboxylic acid, or mixture thereof from carbon dioxide and hydrogen, the method comprising:
generating a plasma using a dielectric barrier discharge, DBD device; and
exposing the carbon dioxide in the presence of hydrogen to a catalyst comprising copper and/or nickel and/or cobalt on a support in the generated plasma, thereby forming the C1 to C5 alcohol, carboxylic acid, or mixture thereof from at least some of the carbon dioxide; and wherein the DBD device comprises a water electrode.

In one example, the method is carried out using an apparatus according to the first aspect.

The C1 to C5 alcohol, carboxylic acid, or mixture thereof, carbon dioxide, the hydrogen, the plasma, the DBD device, the water electrode, the catalyst, the nickel, the cobalt, the copper and/or the support may be as described with respect to the first aspect. The method may include any of the steps and/or features described with respect to the first aspect, mutatis mutandis.

In one example, the reaction temperature (i.e. the temperature at which the carbon dioxide is exposed to the catalyst in the presence of hydrogen in the generated plasma) is in a range from 15 to 50° C. and more preferably in a range from 18 to 40° C. The reaction temperature may suitably be described as ambient temperature.

In one example, the method comprises externally heating the carbon dioxide, the catalyst and/or the hydrogen, for example using an external source of heat. In one preferred example, the method comprises no external heating. In this way, the reaction temperature is provided, for example at least partly and/or fully, by the generated plasma.

The method according to the second aspect offers a significant advantage over conventional methods as the reaction may be performed at relatively low temperatures, without an external source of heat. This reduces the energy consumption of the process. Additionally and/or alternatively, it is not necessary to remove heat from the process or provide processes to prevent overheating of the process. This may be because the water used in the water electrode can be used to cool the reaction to an ambient temperature.

Additionally and/or alternatively, since the reaction may be performed at relatively low temperatures, the method may be initiated (i.e. switched on) and/or paused or terminated (i.e. switched off) on demand, for example immediately or instantly, since preheating is not required, for example.

Since the generated plasma reaches a stable state in a relatively short time, the method may be stopped and subsequently restarted without any additional waiting time, improving an efficiency of the process. In this way, the process provides great flexibility to be integrated with renewable energy sources such as wind and solar power, especially the use of intermittent renewable energy during peak load for localised or distributed energy storage.

In one example, the method comprises activating the catalyst using, at least in part, the generated plasma, for example by supplying an electrical power in a range of 0.72 to 50 kJ/L, preferably in a range of from 10 to 40 kJ/L, relative to the gas flow rate (L) This may also be defined as the specific energy input (SEI).

The conversion of carbon dioxide $X_{CO_2}$ may be defined by Equation (1):

$$X_{CO_2}(\%) = \frac{CO_2 \text{ converted (mol/s)}}{CO_2 \text{ input (mol/s)}} \times 100 \quad (1)$$

In one example, the method has a conversion $X_{CO_2}$, as defined by equation (1), of carbon dioxide of 10%, preferably at least 15%, more preferably at least 20%.

The conversion of hydrogen $X_{H_2}$ may be defined by Equation (2):

$$X_{H_2}(\%) = \frac{H_2 \text{ converted (mol/s)}}{H_2 \text{ input (mol/s)}} \times 100 \quad (2)$$

Suitably the method has a conversion $X_{H2}$, as defined by equation (2), of hydrogen of at least 5%, preferably at least 15%.

The selectivity of methanol $SC_{H_3OH}$ may be defined by Equation (3):

$$S_{CH_3OH}(\%) = \frac{CH_3OH \text{ produced (mol/s)}}{CO_2 \text{ converted (mol/s)}} \times 100 \quad (3)$$

In one example, the method has a selectivity $SC_{H_3OH}$ of methanol of at least 25%, preferably at least 30%, more preferably at least 35%, most preferably at least 40%. In one especially preferred example, the method has a selectivity $SC_{H_3OH}$ of methanol of at least 45%.

The yield of methanol $Y_{CH_3OH}$ is calculated using Equation (4):

$$Y_{CH_3OH}(\%) = \frac{CH_4 \text{ produced (mol/s)}}{CO_2 \text{input (mol/s)}} \quad (4)$$

In one example, the method has a yield $Y_{CH_3OH}$ of methanol at least 10%, preferably at least 15%. In one example, the method has a yield $Y_{CH_3OH}$ of methanol at least 35%, preferably at least 35%.

In one example, exposing the carbon dioxide to the catalyst in the presence of hydrogen in the generated plasma comprises exposing the carbon dioxide to the catalyst in the presence of hydrogen in the generated plasma at approximately ambient pressure. It should be understood that approximately ambient pressure is the substantially natural pressure of the environment, for example about 101 kPa.

The method comprises exposing the carbon dioxide to the catalyst comprising nickel and/or cobalt and/or copper on a support in the presence of hydrogen in the generated plasma, thereby forming the C1 to C5 alcohol, carboxylic acid, or mixture thereof from at least some of the carbon dioxide and hydrogen.

In one example, the method comprises exposing the carbon dioxide to the catalyst comprising nickel and/or cobalt on a support in the presence of other gases, for example inert gases such as argon and/or nitrogen and/or reactive gases such as oxygen, amongst others. However, one preferred example only carbon dioxide and hydrogen and unavoidable impurities are present, notwithstanding reaction products including C1 to C5 alcohol, carboxylic acid, or mixture thereof.

In one example, exposing the carbon dioxide to the catalyst in the presence of hydrogen in the generated plasma comprises exposing the carbon dioxide to the catalyst in the presence of an excess of hydrogen (i.e. relative to a stoichiometric ratio of 1:2). For example, in one preferred embodiment carbon dioxide and hydrogen are provided in a ratio of 1:2 to 1:4. For example, the carbon dioxide and hydrogen may be provided in a molar ratio of 1:2, 1:3 or 1:4.

Catalyst

A third aspect provides a catalyst comprising nickel and/or cobalt and/or copper on a support.

The catalyst, the nickel, the cobalt, the copper and/or the support may be as described with respect to the first aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

EXAMPLES

Figure 1A:
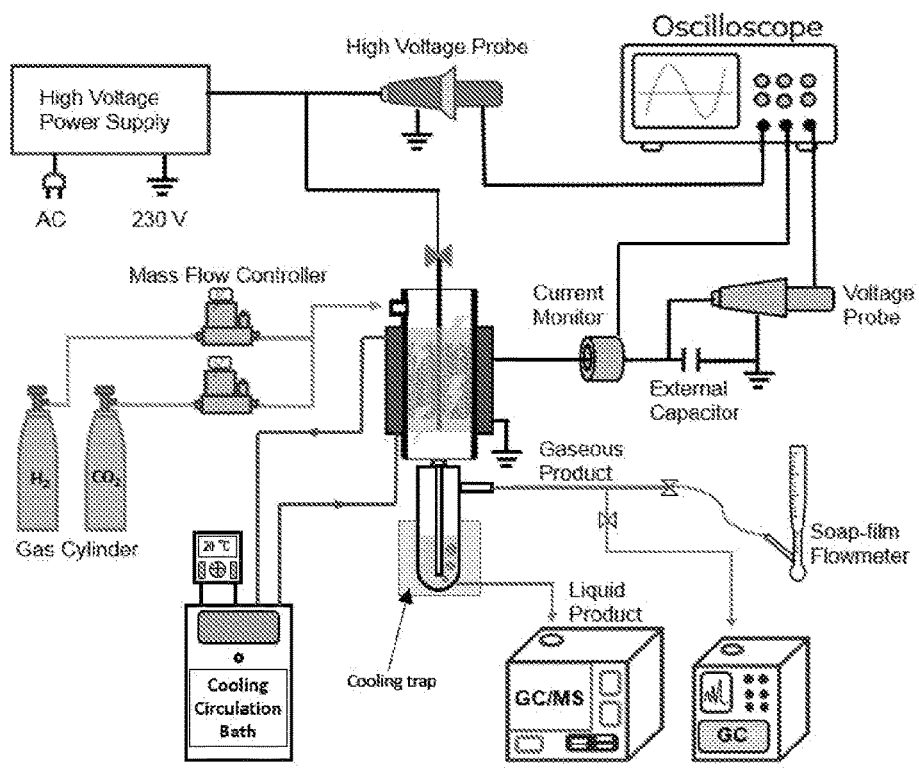
FIG. 1A shows a schematic diagram of the water-cooled DBD system.
Figure 1B:
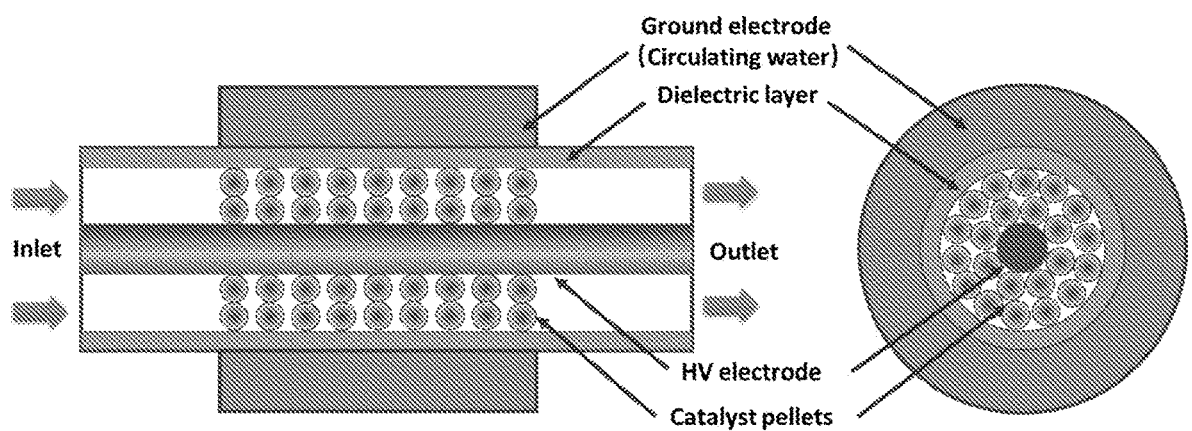
FIG. 1B shows a detailed structure of the DBD plasma-catalytic reactor using a water electrode.

The experiments were conducted in a coaxial DBD reactor with a special and novel electrode design, as shown in FIGS. 1A and 1B. Compared to traditional DBD reactors using metal as a ground electrode, this reactor used circulating water as both a ground electrode and cooling of the reactor. A cooling circulation bath (Grant LT Ecocool 150) was used to control the temperature of the discharge at 20° C. for Ni/ZSM-5 (35° C. for Ni—Co alloy and Cu-based catalysts). The length of the discharge region was 50 mm and the discharge gap was 1 mm (2 mm for Cu-based catalysts). The DBD reactor was connected to an AC high voltage power supply with a peak voltage of up to 30 kV. The DBD discharge power maintained at 20 W for Ni/ZSM-5 (10 W for Ni—Co alloy and 25 W for Cu-based catalysts), and the frequency was fixed at 9.2 kHz. $CO_2$ and $H_2$ were used as reactants at a total flow rate of 30 mL/min and a $CO_2/H_2$ molar ratio of 1:4 for Ni/ZSM-5 (1:3 for Ni—Co alloy and Cu-based catalysts). Catalyst was fully packed in the discharge area and 500 mg of catalyst was used for each testing.

The applied voltage of the DBD was measured by a high-voltage probe (TESTEC, HVP-15HF), while the current was recorded by a current monitor (Bergoz, CT-E0.5). The voltage on the external capacitor was used to measure the charge formed in the DBD. All the electrical signals were sampled by a four-channel digital oscilloscope (Tektronix, MDO 3024). A homemade system was used to monitor and control the discharge power of the DBD in real-time. The gas temperature in the discharge area near the catalyst bed was measured using a fiber optical thermometer (Omega, FOB102).

The gaseous products were analyzed using a gas chromatograph (Shimadzu GC-2014) equipped with a thermal conductivity detector (TCD) and a flame ionized detector (FID). A water/ice mixture bath was placed at the exit of the DBD reactor to condense liquid products. The oxygenates were qualitatively analyzed using a gas chromatography-mass spectrometer (GC-MS, Agilent GC 7820A and Agilent MSD 5973) and quantitatively analyzed using a gas chromatograph (Agilent 7820) equipped with a FID with a DB-WAX column. The change of the gas volume before and after the reaction was measured using a soap-film flow meter. Sampling and measurements started after running the reaction for 1 h and lasted for 3 h (3.5 h for Cu-based catalysts). Each measurement was repeated three times, and the measurement error was less than 4%.

Example 1: Ni/ZSM-5

Catalyst Preparation

Hierarchical ZSM-5 nanocrystals with different Si/Al ratios were prepared as follows: sodium aluminate was dissolved in tetrapropylammonium hydroxide, together with deionized water and sodium hydroxide, TEOS were added to this solution. The volumes of these precursor solutions were determined by the certain ratios of Si/Al. The suspension obtained was maintained under mechanical agitation for 2 h. The mixture was heated at 140° C. and kept at this temperature for 72 h in hydrothermal vessel. The obtained solid by centrifugation was washed with deionized water and then dried at 60° C. for 12 h. The sample was then calcined at 550° C. for 5 h.

Then, nickel based ZSM-5 catalysts were prepared by wet impregnation using nickel nitrate. Various amounts of nickel nitrate hexahydrate, depending on the quantity of nickel required on the catalyst, were added to deionized water. This solution was then added into the support, and then stirred and dried at 105° C. This was followed by calcination in are at 450° C. for 2 h with a heating rate of 10° C./min.

Characterization $N_2$ adsorption-desorption measurements were carried out using an Autosorb IQ-C system at 77 K after outgassing the sample under vacuum at 573 K for 10 h. The specific surface area is calculated with BET method. X-ray diffraction (XRD) patterns of the calcined and reduced samples were recorded on a PANalytical XPert Pro powder diffractometer (45 kV and 40 mA) using Cu Kα radiation source (λ=1.5405 Å) in the 2θ range from 5° to 80°.

Physical Properties of the Hierarchical Ni/ZSM-5 Zeolites

Figure 2:
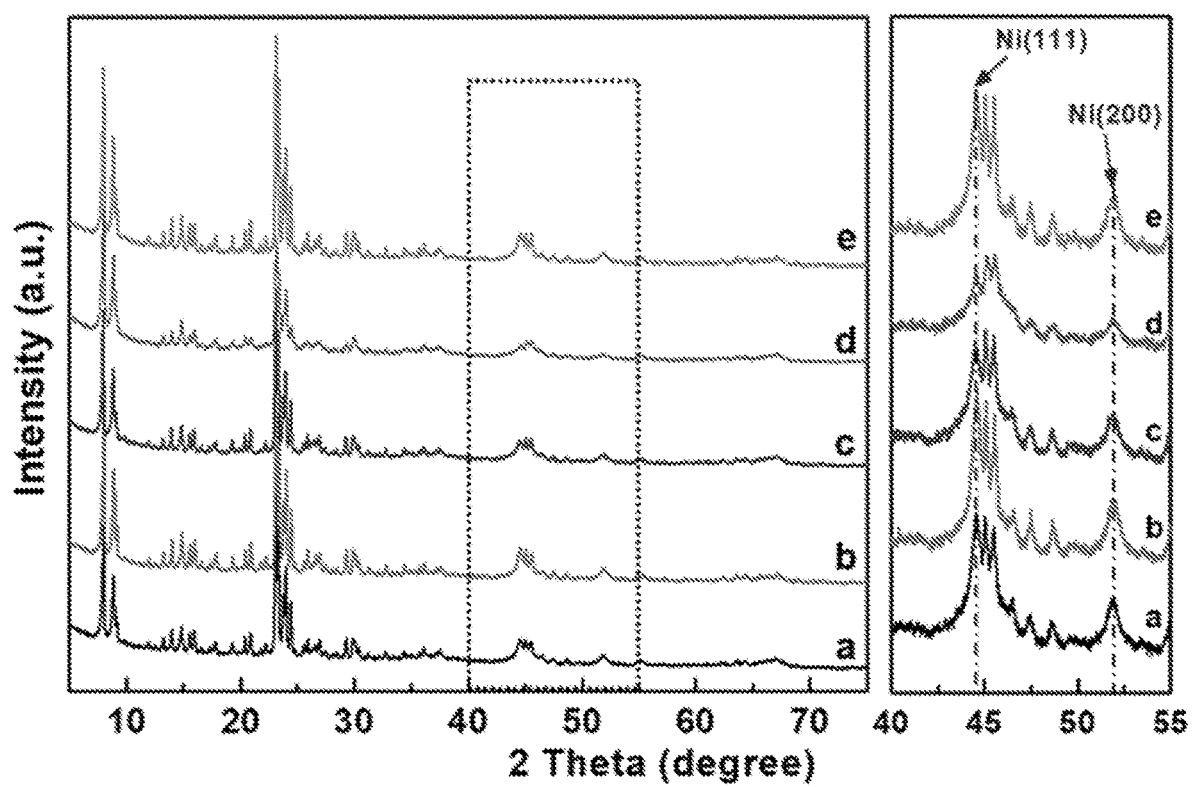
FIG. 2 shows XRD profiles of reduced Ni/ZSM-5 catalysts (a) Ni/ZSM-5(25)-Re, (b) Ni/ZSM-5(38)-Re, (c) Ni/ZSM-5(50)-Re, (d) Ni/ZSM-5(80)-Re and (e) Ni/ZSM-5(200)-Re.

The XRD diffraction patterns of as-prepared reduced Ni/ZSM-5 catalysts at 10% nickel loading are shown in FIG. 2. The peaks at 2θ value at 7.9° 8.80, 22.90, 23.8° and 24.3° exhibit the characteristic MFI-type zeolite formation. This indicated that the crystalline structure of the ZSM-5 remained constant after 10% nickel loading. Additionally, all the reduced Ni/ZSM-5 catalysts showed XRD reflections at 44.50° (111) and 51.85° (200) corresponding to metallic Ni.

Figure 3A:
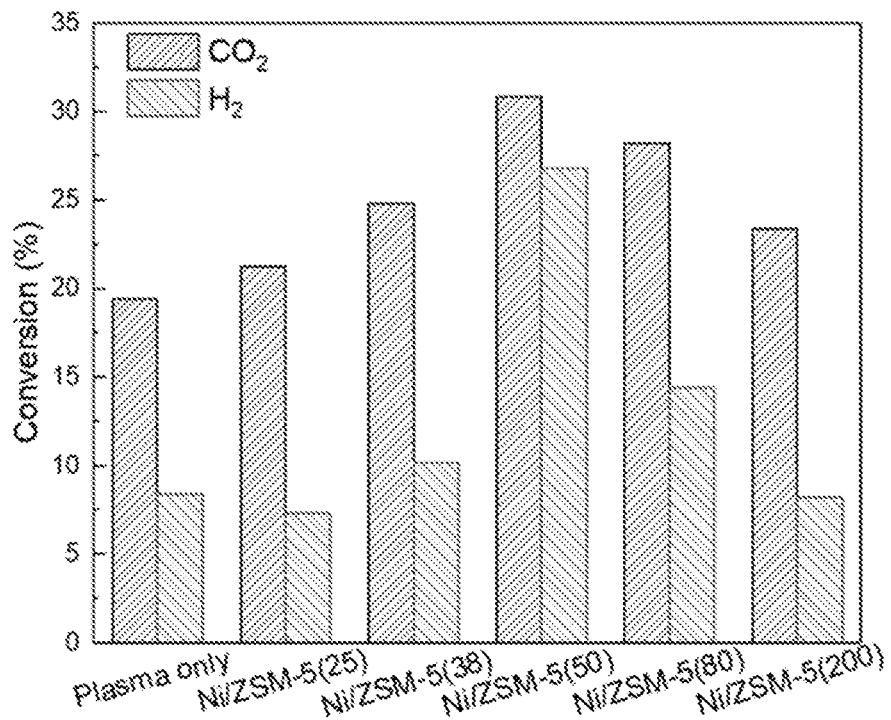
FIG. 3 shows an evaluation of catalyst activities for $CO_2$ hydrogenation. (A) Effect of catalysts on the conversion of $CO_2$ and hydrogen at an SEI of 40 kJ/L. The selectivity (B), yield (C) of major carbon containing products (CO, $CH_4$ and MeOH)
Figure 3B:
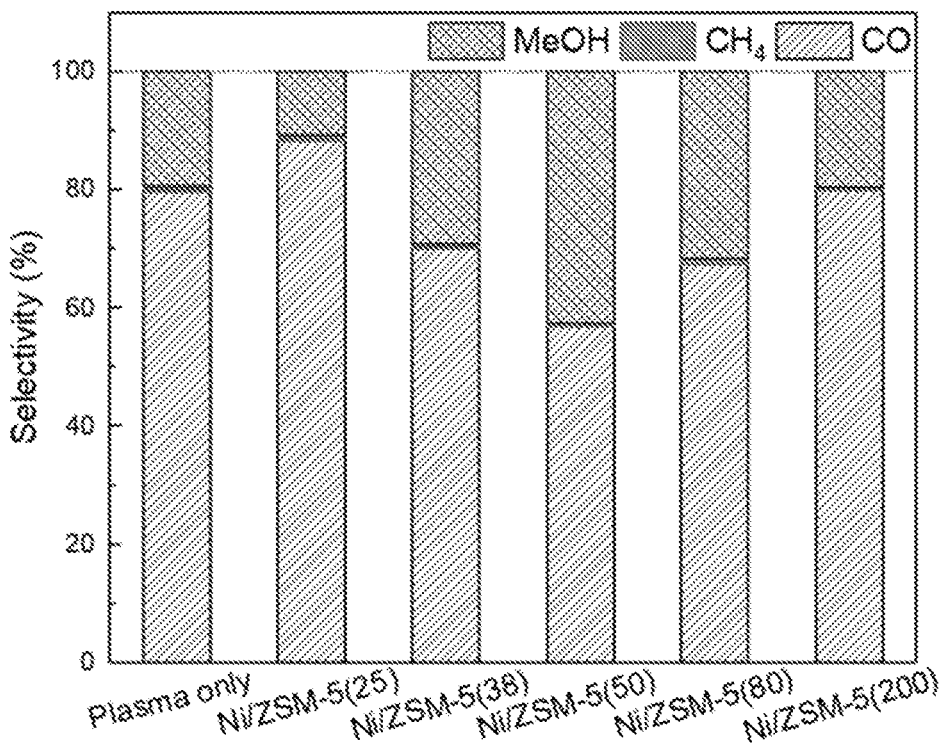
Figure 3C:
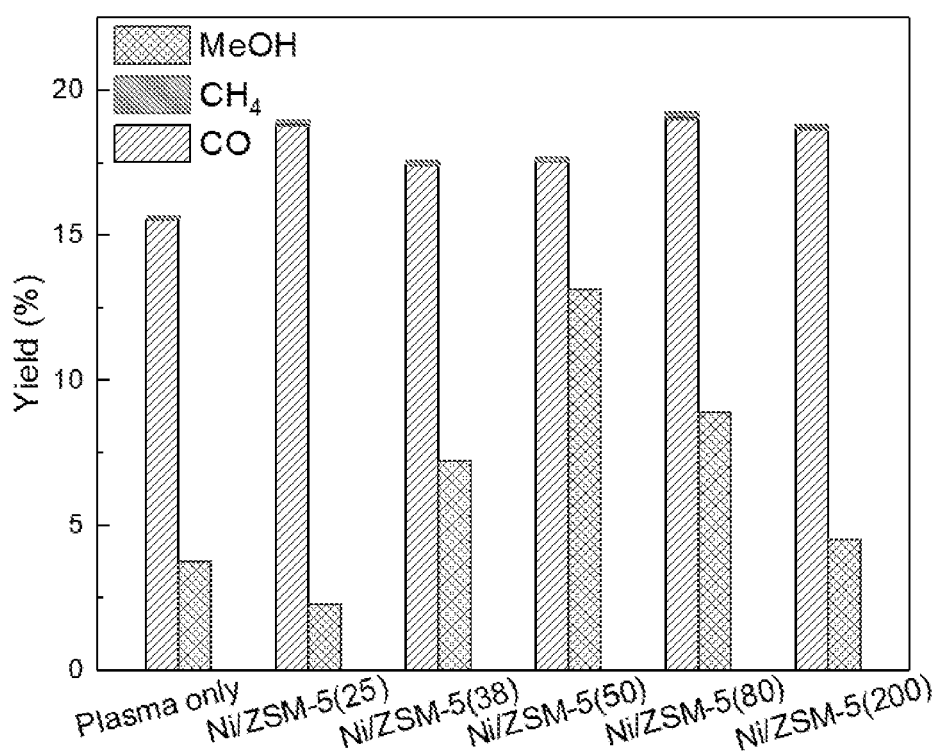

The physical properties of the as-prepared reduced Ni/ZSM-5 catalysts at 10% nickel loading are summarized in Table 1. All the reduced Ni/ZSM-5 catalysts contain similar surface area ($S_{BET}$ from 224 to 266 m$^2$/g). The Ni/ZSM-5(50)-Re catalyst has the largest mesoporous volume ($V_{meso}$=0.1538 cm$^3$/g). The $N_2$ adsorption-desorption isotherms at 77 K for as-prepared reduced 10Ni/ZSM-5 catalysts with different Si/Al ratios are shown in FIG. 3A. All catalysts exhibit a type-IV isotherm with $H_2$ hysteresis loops, suggesting the mesoporous structures. Clearly, the Ni/ZSM-5(50)-Re catalyst has the largest hysteresis loop, agreeing with its larger degree of mesopores than others. FIG. 3B depicts the BJH pore size distributions of reduced Ni/ZSM-5 catalysts with different Si/Al ratios. All the catalysts except the 10Ni/ZSM-5(38)-Re display relatively sharp distribution of mesopores at 5-10 nm diameter.

TABLE 1

Physical properties reduced Ni/ZSM-5 catalysts.[a]

| Samples | $S_{BET}$ (m$^2$/g) | $S_{micro}$ (m$^2$/g) | $S_{meso}$ (m$^2$/g) | $V_{total}$ (cm$^3$/g) | $V_{micro}$ (cm$^3$/g) | $V_{meso}$ (cm$^3$/g) |
|---|---|---|---|---|---|---|
| Ni/ZSM-5(25)-Re | 247 | 142 | 105 | 0.2089 | 0.071 | 0.1379 |
| Ni/ZSM-5(38)-Re | 243 | 186 | 57 | 0.1762 | 0.096 | 0.0802 |
| Ni/ZSM-5(50)-Re | 265 | 186 | 79 | 0.2548 | 0.101 | 0.1538 |
| Ni/ZSM-5(80)-Re | 224 | 115 | 109 | 0.1938 | 0.058 | 0.1358 |
| Ni/ZSM-5(200)-Re | 266 | 156 | 110 | 0.2229 | 0.08 | 0.1429 |

[a]Measured by $N_2$ porosimetry.

Figure 4A:
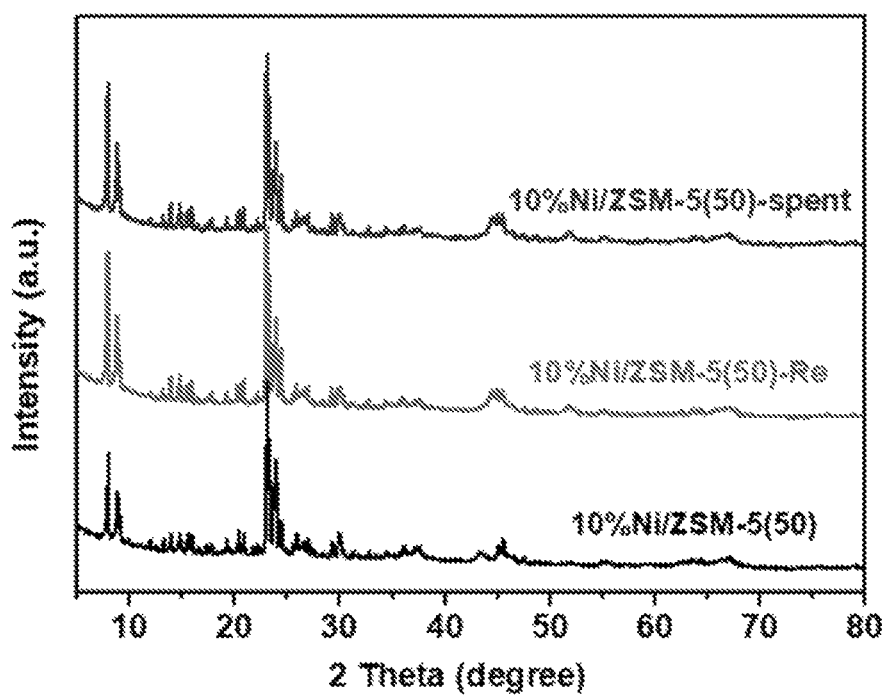
FIGS. 4A and B show a comparison of XRD patterns of calcined, reduced and spent samples of Ni/ZSM-5(50) catalysts.
Figure 4B:
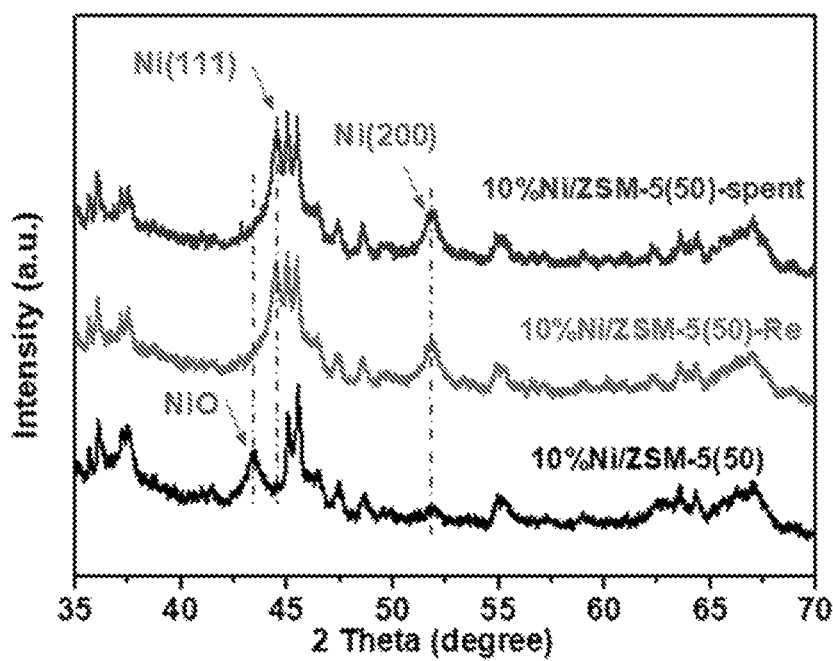

On the spent Ni/ZSM-5(50)-spent catalysts, as shown in FIGS. 4A and 4B, the intensity of the peaks associated with Ni(111) and Ni(200) show unchanged. No NiO at 2θ value at 43.5° was observed on the reduced Ni/ZSM-5(50)-Re and spent Ni/ZSM-5(50)-spent catalysts.

Example 2: Bimetallic Ni—Co Alloy Catalysts on an Alumina Support

Catalysts comprising nickel and/or cobalt on an alumina support were prepared as follows: 10 wt. % nickel (10Ni), 7 wt. % nickel and 3 wt. % cobalt (7Ni3Co), 5 wt. % nickel and 5 wt. % cobalt (5Ni5Co), 3 wt. % nickel and 7 wt. % cobalt (3Ni7Co) and 10 wt. % cobalt (10Co)

Bimetallic xNi-(10-x) Co/Al$_2$O$_3$ (x=10, 7, 5, 3 and 0 wt %) alloy catalysts were prepared by ultrasonic incipient-wetness impregnation using nitrate salts (Alfa Aesar, 99.5%) as the metal precursor. Initially, a certain amount (3 g) of catalyst support (Al$_2$O$_3$) was added into the solution of nitrate salts. The slurry was continuously ultrasonic treated at 60° C. for 2 h, after which it was aged at room temperature overnight. The samples were then dried at 110° C. for 5 h and calcined at 500° C. for 5 h. The catalysts were then sieved to 40-60 meshes and reduced by a mixture of $Ar/H_2$ (50 mL/min; $Ar/H_2$ volume ratio 3:2) at 550° C. for 5 h before the plasma reaction. The calcined catalysts are labelled as $Ni_xCo_{10-x}$-c (x=10, 7, 5, 3 and 0), while the pristine catalysts (reduced samples) are labelled as $Ni_xCo_{10-x}$ (x=10, 7, 5, 3 and 0) in following content. Otherwise, the spent catalysts are assigned to $Ni_xCo_{10-x}$-s (x=10, 7, 5, 3 and 0).

Characterization $N_2$ adsorption-desorption measurements were carried out using an Autosorb IQ-C system at 77 K after outgassing the sample under vacuum at 573 K for 10 h. The specific surface area is calculated with BET method. X-ray diffraction (XRD) patterns of the calcined and reduced samples were recorded on a PANalytical XPert Pro powder diffractometer (45 kV and 40 mA) using Cu Kα radiation source (λ=1.5405 Å) in the 2θ range from 5° to 80°.

TABLE 2

Physical properties of the pristine catalysts.

| Samples | Surface area ($m^2/g$) | Total pore volume ($cm^3/g$) | Average pore diameter (Å) |
| --- | --- | --- | --- |
| $Al_2O_3$ | 221 | 0.43 | 77.5 |
| 10Ni | 210 | 0.39 | 74.1 |
| 7Ni3Co | 159 | 0.32 | 79.7 |
| 5Ni5Co | 181 | 0.35 | 77.8 |
| 3Ni7Co | 166 | 0.32 | 78.2 |
| 10Co | 218 | 0.39 | 71.1 |

Figure 5:
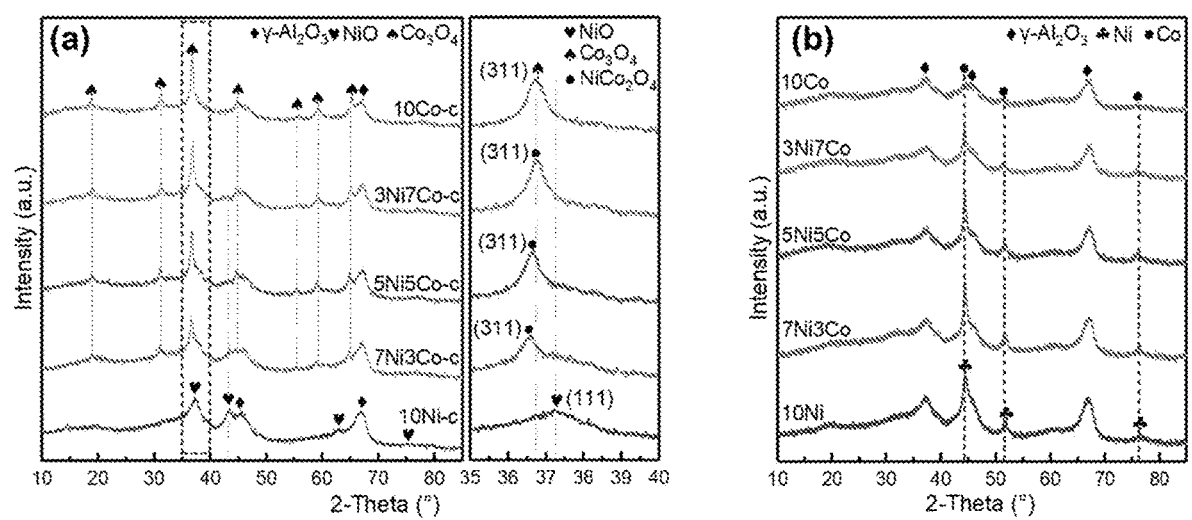
FIG. 5 shows the XRD patterns of (a) calcined and (b) reduced samples of Ni/Co catalysts on an alumina support.

FIG. 5 shows the XRD patterns of the calcined samples and the reduced samples. The major diffraction peaks at 2θ=37.6°, 45.9° and 67.0° can correspond to the cubic structure of crystalline γ-$Al_2O_3$ (JCPDS 00-010-0425) both in FIG. 5(a). The characteristic diffraction peaks centred at 2θ=37.3°, 43.3°, 62.9°, and 75.4° could be attributed to the (111), (200), (220), and (311) lattice planes of NiO (JCPDS #78-0643). Meanwhile, the peaks located at 2θ=19.0°, 31.3°, 36.9°, 44.8°, 55.7°, 59.4°, and 65.3° could well match with the (111), (220), (311), (400), (422), (511), and (440) lattice planes of $Co_3O_4$ (JCPDS #76-1802) respectively. Furthermore, there is a shift of the diffraction peak (around 37°) of the bimetallic Ni—Co oxides, especially in 7Ni3Co and 5Ni5Co, suggesting the formation of $NiCo_2O_4$ (JCPDS #20-0781) spinel, which demonstrates the formation of Ni—Co alloy after reduction. FIG. 5(b) The peaks of all samples match well with the standard peaks of Ni (JCPDS 04-0850) and Co (JCPDS 01-1255). There are no obvious characteristic peaks of $Co_3O_4$ and NiO, suggesting a relative complete thermal-reduction of the samples.

Performance

Compared to the plasma reaction without a catalyst, the combination of DBD with these catalysts enhances the conversion of $CO_2$ and $H_2$.

Figure 6A:
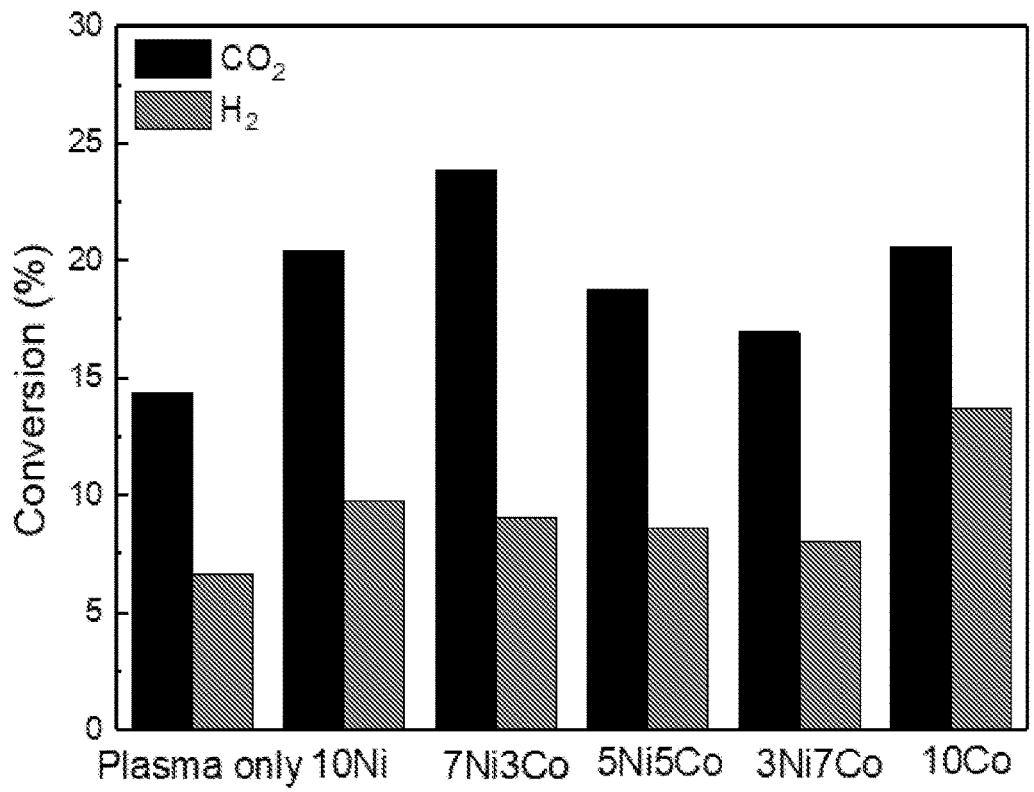
FIG. 6 shows the effect of different catalysts on C02 hydrogenation at an SEI of 20 kJ/L (A) conversion of $CO_2$ and hydrogen; (B) selectivity of gaseous products; (C) product distribution (selectivity) and (D) yield of alcohol (MeOH+EtOH) and acetic acid (AcA)
Figure 6B:
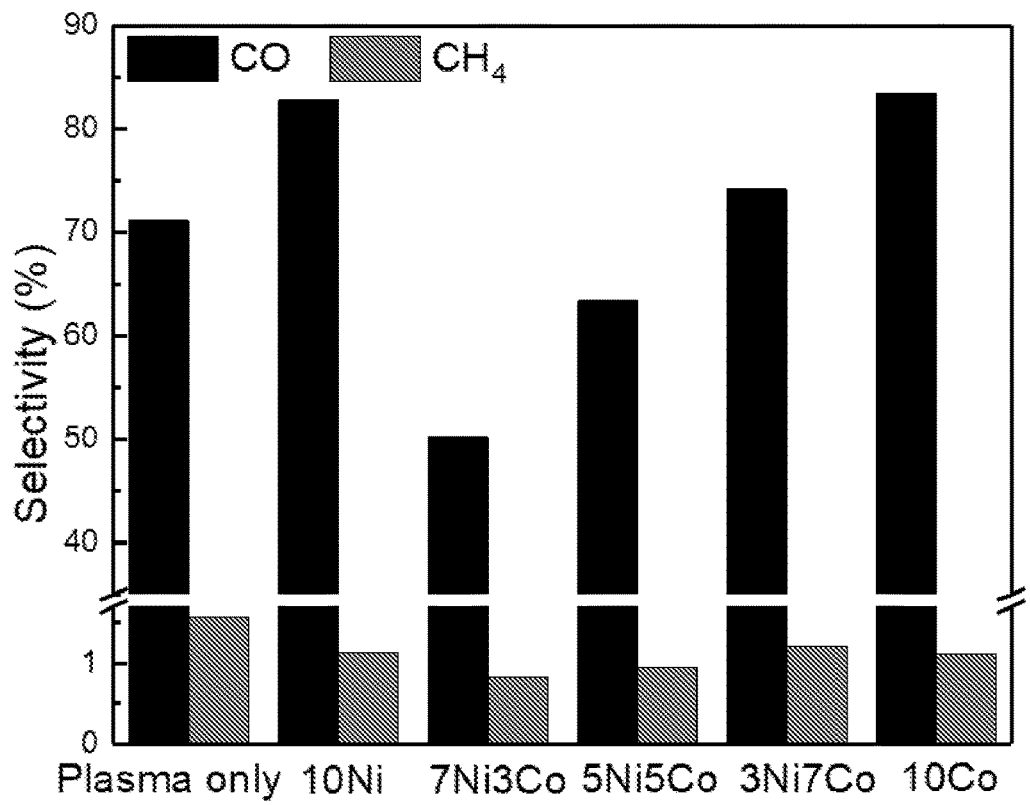

It was found that 7Ni3Co shows the highest $CO_2$ conversion of 24% with $CO_2$. It was also found that the bimetallic Ni—Co alloy catalysts generate less CO and $CH_4$ and produce more liquid chemicals (FIG. 6A), suggesting that the existence of Ni—Co alloy would inhibit the production of CO.

Figure 6C:
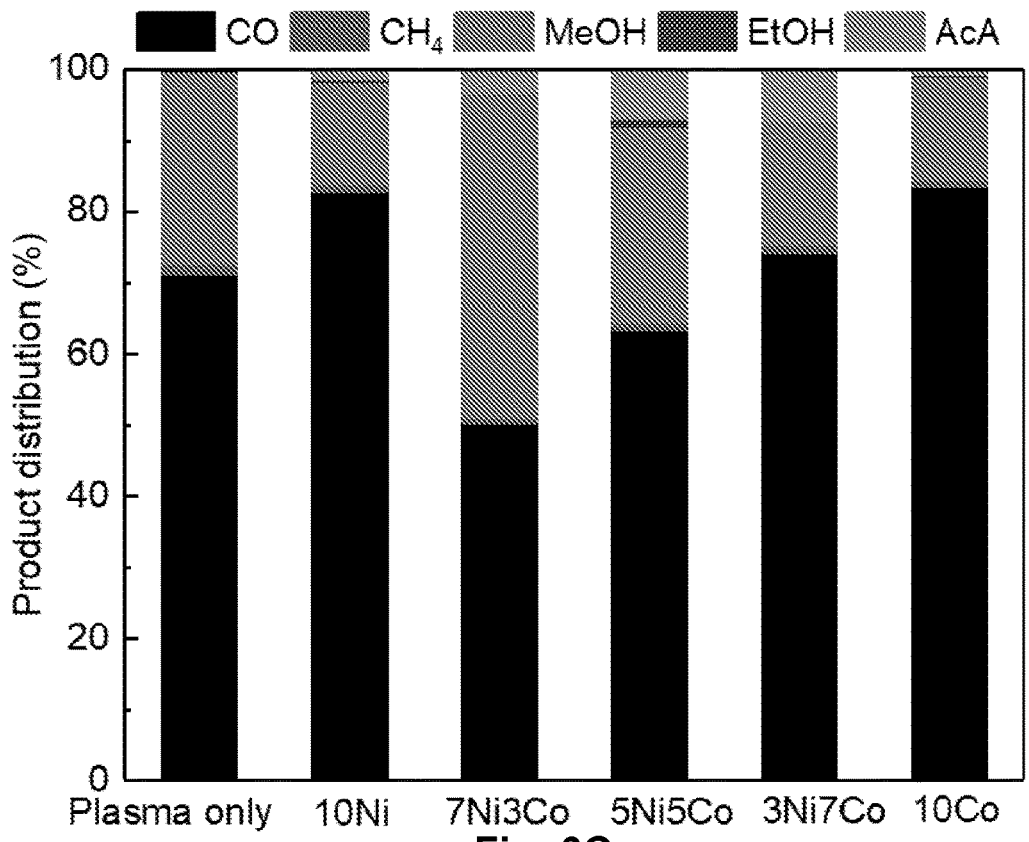

FIG. 6C shows the distribution of main products, including gaseous products (CO and $CH_4$) and major liquid products (methanol (MeOH), ethanol (EtOH) and acetic acid (AcA)).

7Ni3Co exhibits the highest methanol selectivity of 45.4%.

Figure 6D:
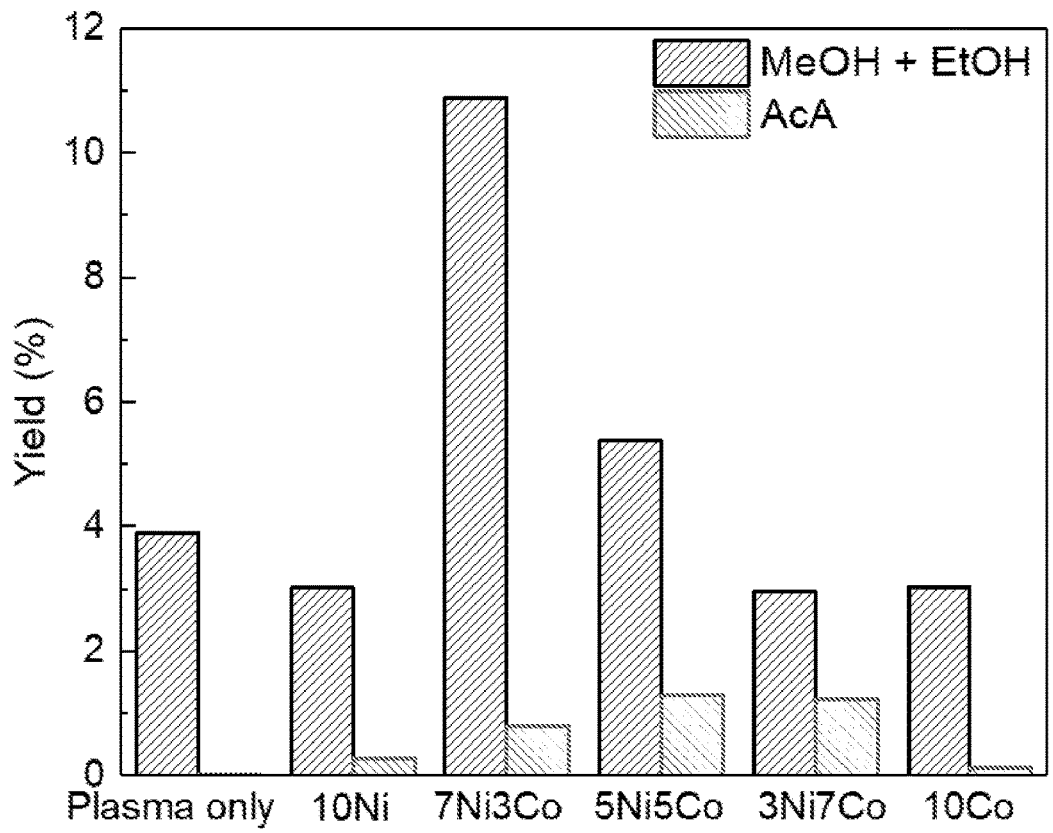

7Ni3Co shows the highest alcohol (methanol+ethanol) yield of 11% (FIG. 6D). The yield of acetic acid is 0.8% using 7Ni3Co. 5Ni5Co shows the highest yield of acetic acid (1.3%).

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

Example 3: Cu-Based Catalysts with Different Supports

Catalysts comprising copper on a series of supports, including $Al_2O_3$, $TiO_2$, $CeO_2$, $SiO_2$ (mesoporous), were prepared as follows: 10 wt. % $Cu/Al_2O_3$ (Cu/Al), 10 wt. % $Cu/TiO_2$ (Cu/Ti), 10 wt. % $Cu/CeO_2$ (Cu/Ce), 10 wt. % $Cu/SiO_2$ (Cu/Si).

Cu-based catalysts using different supports were prepared by an ultrasonic incipient-wetness impregnation. Desired amount of copper nitrate (Alfa Aesar, 99.5%) was dissolved in deionized water, and the obtained solution was vigorously stirred at room temperature for 15 min. After that, a certain amount (3 g) of catalyst supports ($Al_2O_3$, $TiO_2$, $CeO_2$, or mesoporous $SiO_2$) was added into this precursor solution. The slurry was continuously ultrasonic treated at 60° C. for 2 h, followed by aging overnight at room temperature. The samples were then dried at 110° C. for 5 h and calcined at 500° C. for 5 h. The catalysts were then sieved to 40-60 meshes and reduced by $Ar/H_2$ mixed gas (50 mL/min; $Ar/H_2$=3:2) at 550° C. for 5 h before the plasma reaction.

Physical Properties of the Cu-Based Catalysts

The XRD diffraction patterns of as-prepared reduced Cu-based catalysts at 10% copper loading are shown in FIG. 7. The peaks in all XRD patterns at 2θ value at 43.6°, 50.8° and 74.4° exhibit the formation of metallic copper (JCPDS #04-0836). Weak peaks of CuO (JCPDS #45-0937) could be found on both $TiO_2$ (FIG. 7(A)) and $SiO_2$ (FIG. 7(C)). Further, typical diffraction peaks in FIG. 7(a) indicate the presence of both anatase (JCPDS #21-1272) and rutile (JCPDS #21-1276) phases of $TiO_2$. The XRD pattern of γ-$Al_2O_3$ (JCPDS #00-010-0425) could be observed in FIG.

Figure 7A:
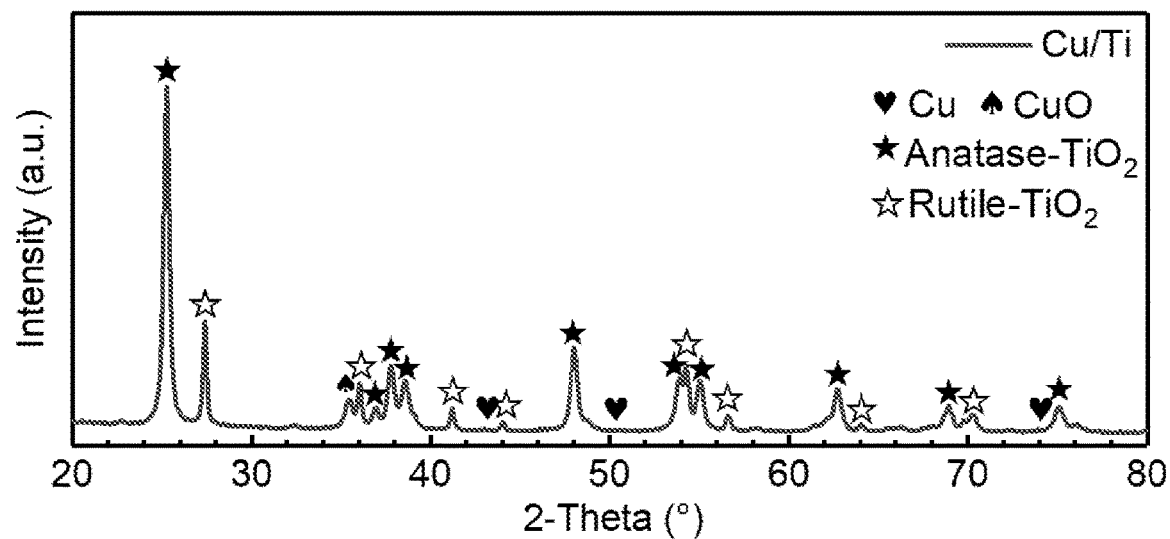
FIG. 7 shows the XRD patterns of (A) $Cu/TiO_2$ (Cu/Ti), (B) $Cu/Al_2O_3$ (Cu/Al), (C) $Cu/SiO_2$ (Cu/Si) and (D) $Cu/CeO_2$ (Cu/Ce) catalysts.
Figure 7B:
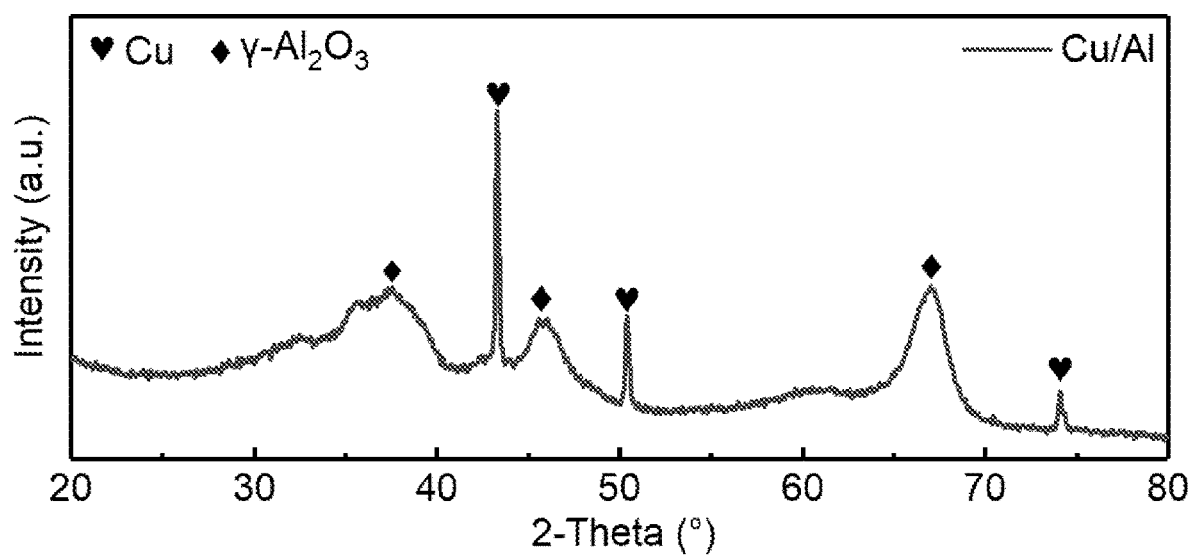
Figure 7C:
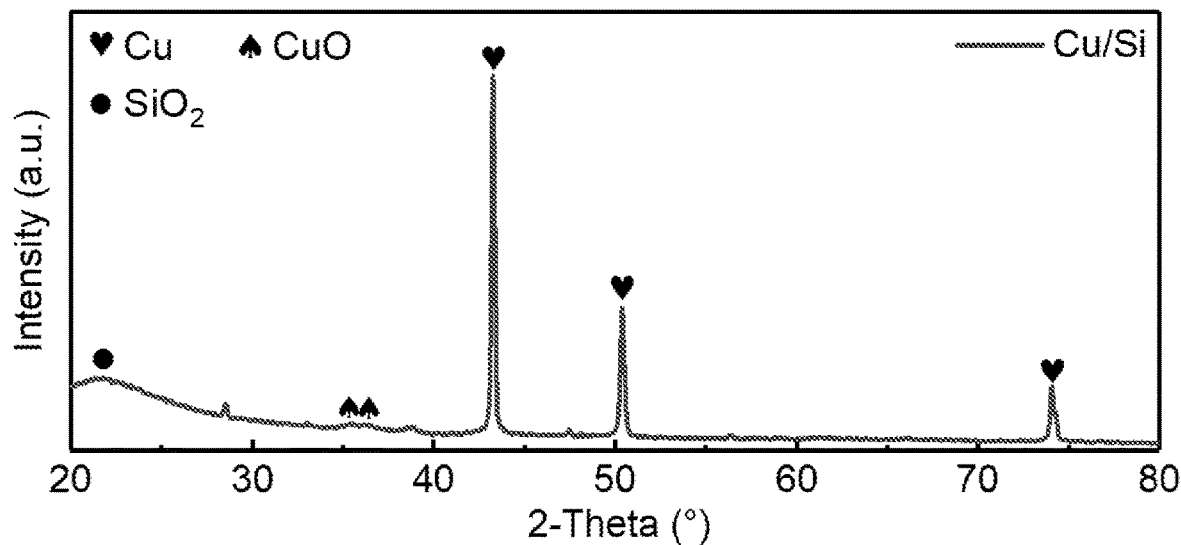
Figure 7D:
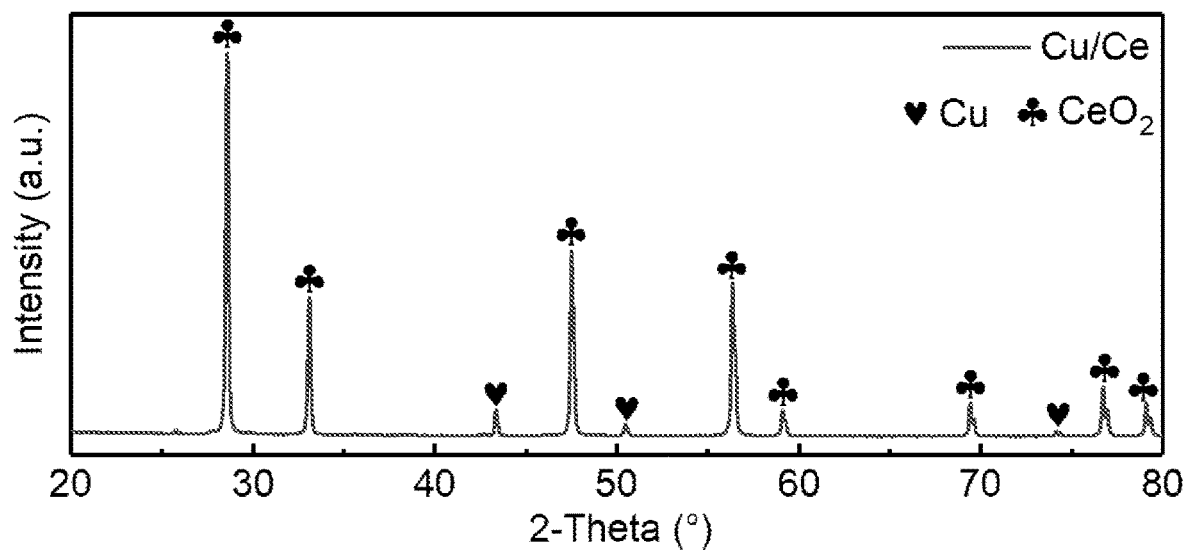

7(B), and the XRD pattern of Cu/Ce (FIG. 7(D)) shows a typical diffraction pattern of cubic fluorite-type $CeO_2$ (JCPDS #34-0394).

Performance

Figure 8A:
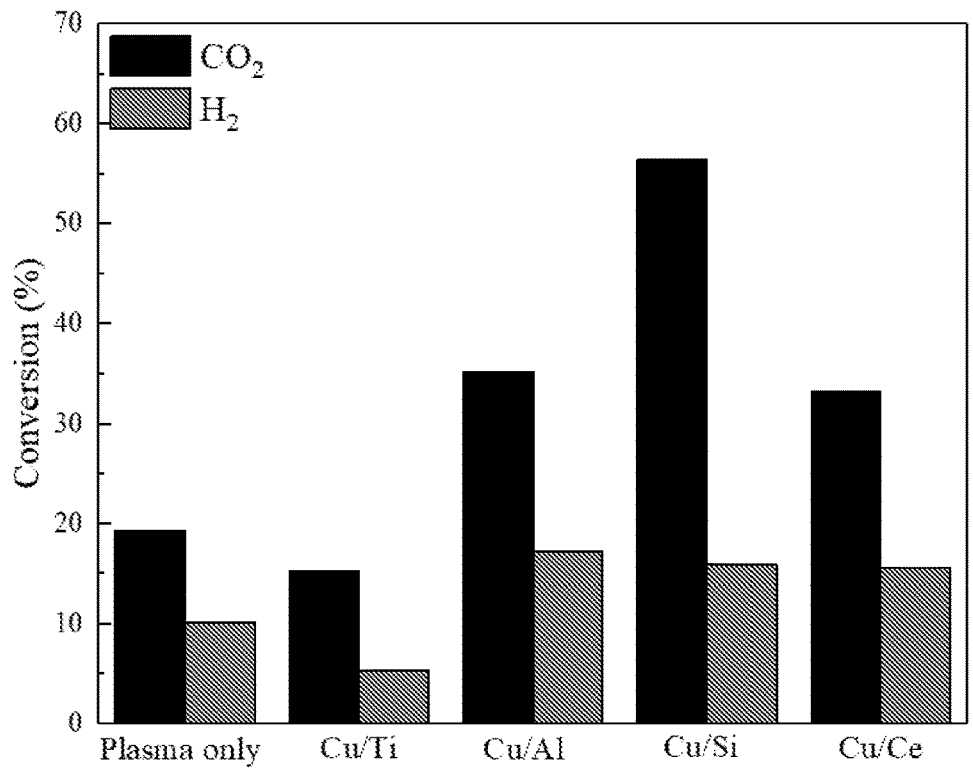
FIG. 8 shows the effect of different Cu-based catalysts on C02 hydrogenation (A) conversion of $CO_2$ and hydrogen; (B) selectivity of gaseous products and total gas selectivity; (C) selectivity of liquid products and (D) yield of major products and the ratio of $CO/CH_4$.
Figure 8B:
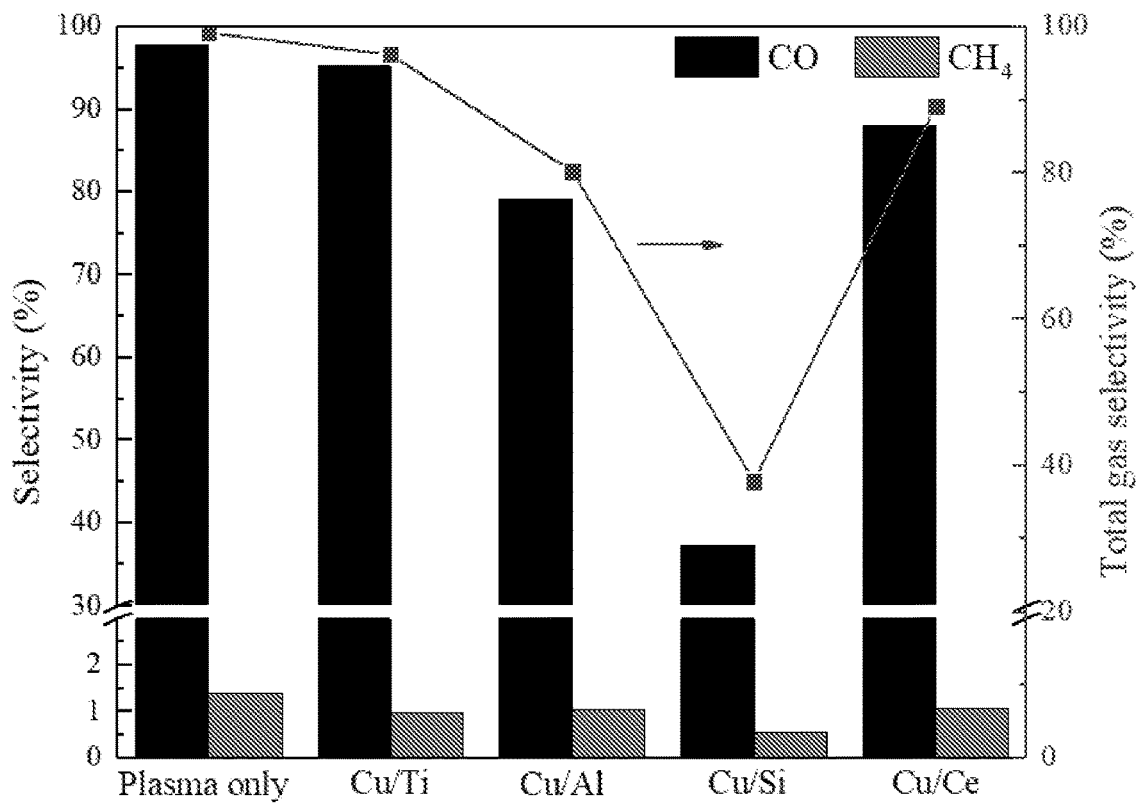

FIG. 8(A) shows the presence of $Cu/Al_2O_3$, $Cu/Ce_2O_3$ and $Cu/SiO_2$ enhances the conversion of $CO_2$ and $H_2$ compared to the plasma $CO_2$ hydrogenation without a catalyst. $Cu/SiO_2$ shows the highest $CO_2$ conversion of 56.4%.

Compared with other catalysts, the $Cu/SiO_2$ catalyst shows significantly lower selectivity of CO and $CH_4$, suggesting that $Cu/SiO_2$ inhibits the production of CO and $CH_4$.

Figure 8C:
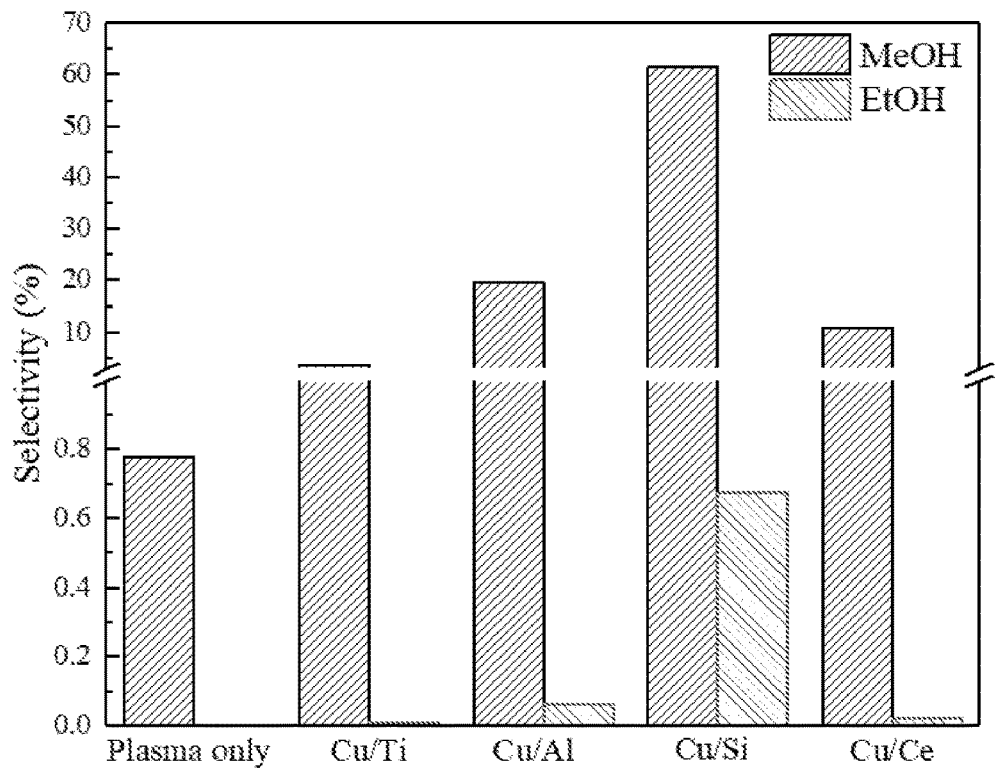
Figure 8D:
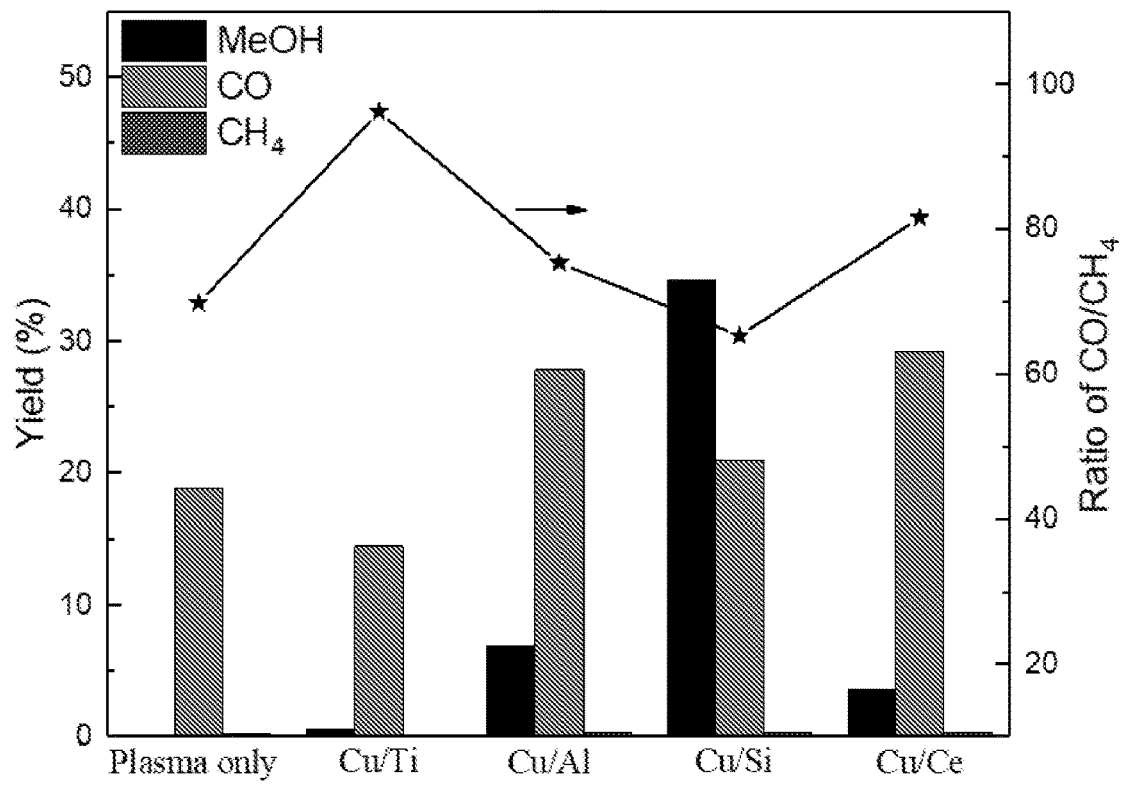

FIG. 8(C) shows the combination of DBD with Cu-based catalysts significantly enhances the selectivity of methanol and ethanol. The $Cu/SiO_2$ catalyst shows the highest methanol selectivity of 61.5% and with an ethanol selectivity of 0.7%.

The highest methanol yield of 35% is achieved using $Cu/SiO_2$ in the plasma $CO_2$ hydrogenation process.

The invention claimed is:

1. An apparatus for forming C1 to C5 alcohol, carboxylic acid, or mixture thereof from carbon dioxide and hydrogen, the apparatus comprising:
    a dielectric barrier discharge, DBD, device arranged to generate a plasma; and
    a passageway including an inlet for the carbon dioxide and the hydrogen and an outlet for the C1 to C5 alcohol, carboxylic acid, or mixture thereof and having a catalyst comprising metallic copper on a support comprising fumed and mesoporous $SiO_2$,
    wherein the passageway extends, at least in part, through the DBD device wherein, in use, the carbon dioxide is exposed to the catalyst in the presence of the hydrogen in the generated plasma, thereby forming the C1 to C5 alcohol, carboxylic acid, or mixture thereof from at least some of the carbon dioxide and the hydrogen and wherein the DBD device comprises a water electrode.

2. The apparatus according to claim 1, wherein the catalyst comprises metallic copper in a range from 1 to 20 wt. % by weight of the support.

3. The apparatus according to claim 1, wherein the catalyst comprises copper in a range from 1 to 15 wt % by weight of the support.

4. The apparatus according to claim 3, wherein the catalyst comprises copper in a range from 2 to 12 wt % by weight of the support.

5. The apparatus according to claim 4, wherein the catalyst comprises 10 wt. % copper by weight of the support.

6. The apparatus according to claim 1, wherein the support comprises aerosol $SiO_2$.

7. A method of forming C1 to C5 alcohol, carboxylic acid, or mixture thereof from carbon dioxide and hydrogen, the method comprising:
    generating a plasma using a dielectric barrier discharge, DBD device; and
    exposing the carbon dioxide in the presence of hydrogen to a catalyst comprising metallic copper on a support in the generated plasma, wherein the support comprises fumed and mesoporous $SiO_2$ thereby forming the C1 to C5 alcohol, carboxylic acid, or mixture thereof from at least some of the carbon dioxide; and wherein the DBD device comprises a water electrode.

8. The method according to claim 7, wherein exposing the carbon dioxide to the catalyst in the presence of hydrogen in the generated plasma comprises exposing the carbon dioxide to the catalyst in the presence of hydrogen in the generated plasma at approximately ambient temperature.

9. The method according to claim 7, wherein exposing the carbon dioxide to the catalyst in the presence of hydrogen in the generated plasma comprises exposing the carbon dioxide to the catalyst in the presence of hydrogen in the generated plasma at approximately ambient pressure.

10. The method according to claim 7, wherein generating the plasma using the DBD device comprises generating a stable plasma in a time in a range of from 1 to 60 minutes.

11. The method according to claim 7, wherein the method comprises activating the catalyst using, at least in part, the generated plasma by supplying a specific energy input in a range of 5 to 100 kJ/L.

12. The method according to claim 7, wherein the C1 to C5 alcohol, carboxylic acid, or mixture thereof is selected from a group consisting of: methanol, ethanol, propane, methanoic acid and ethanoic acid.

13. The method according to claim 12, having a selectivity of methanol of at least 30%.

14. The method according to claim 7, wherein carbon dioxide and hydrogen are provided in a molar ratio of from 1:2 to 1:4.

* * * * *